Jan. 3, 1967 J. A. PERSCHY 3,296,604

BI-DIRECTIONAL CURRENT STEERING SWITCH

Filed Oct. 30, 1963 3 Sheets-Sheet 1

JAMES A. PERSCHY
INVENTOR.

BY
Claude Funkhouser
ATTORNEY

JAMES A. PERSCHY
INVENTOR.

BY

Claude Funkhouser
ATTORNEY

JAMES A. PERSCHY
INVENTOR.
BY
Claude Funkhouser
ATTORNEY

United States Patent Office 3,296,604
Patented Jan. 3, 1967

3,296,604

BI-DIRECTIONAL CURRENT STEERING SWITCH

James A. Perschy, Savage, Md., assignor to the United States of America as represented by the Secretary of the Navy Filed Oct. 30, 1963, Ser. No. 320,238
3 Claims. (Cl. 340—174)

This invention relates to magnetic storage systems and more particularly to a bi-directional current steering switch for such systems, capable of energizing a given memory element line in first one direction and then the opposite direction, and then stepping to the next line to perform the same function.

The data storage section of a magnetic data memory system consists of a toroid ferrite core matrix, operating in a coincident current mode. During the read-write cycle, the toroid ferrite cores are selected one at a time in a coincident current fashion by current steering switches on both axes of the memory matrix.

One possible method of obtaining sequential interrogation of the toroid ferrite cores contained in the memory matrix is to pulse one row on one axis repeatedly while pulsing each column sequentially. The row will be repeatedly pulsed, as many times as the number of columns it intersects, before passing on to the next row. The toroid ferrite cores are interrogated in the same fashion as one reads a book; that is, each core sequentially on one row before moving to the next row.

A memory matrix, operating in a read-restore mode, requires a read current pulse first in one direction on a memory element line for interrogating the toroid ferrite core, and a second current pulse of the opposite polarity on the same memory element line for restoring the information interrogated. Normally these pulses are furnished in each direction by separate current steering switches. One switch furnishing the current on one core winding to interrogate the toroid ferrite core, and the second one furnishing the current on a separate core winding to restore the information interrogated.

In the use of the device of the instant invention with a memory matrix operating in a read-restore mode, a single current steering switch on one axis performs the function of the two normal current steering switches because of its bi-directional capability. It eliminates the need for an additional winding on each toroid ferrite core and an additional current steering switch, with its control circuits, for each memory element line of the memory matrix. In addition, it provides for current transformation so that an increased memory element line current can be produced over the currents utilized in its control circuits. In a memory matrix where multiple turns are required on the memory cores, this current gain feature permits a significant simplification in the memory matrix.

One object of the present invention, therefore, resides in the provision of an improved current steering switch which has the capability of energizing a given memory element line first in one direction and then in the opposite direction, and then stepping to the next line to perform the same function.

Another object of the invention is to provide an improved current steering switch which has the capability of providing increased current transformation.

A further object of the invention is to provide an improved current steering switch having a low power requirement.

Other objects and many of the attendant advantages of this invention will be readily appreciated as the same becomes better understood by reference to the following detailed description when considered in connection with the accompanying drawings, wherein.

Figure 1:
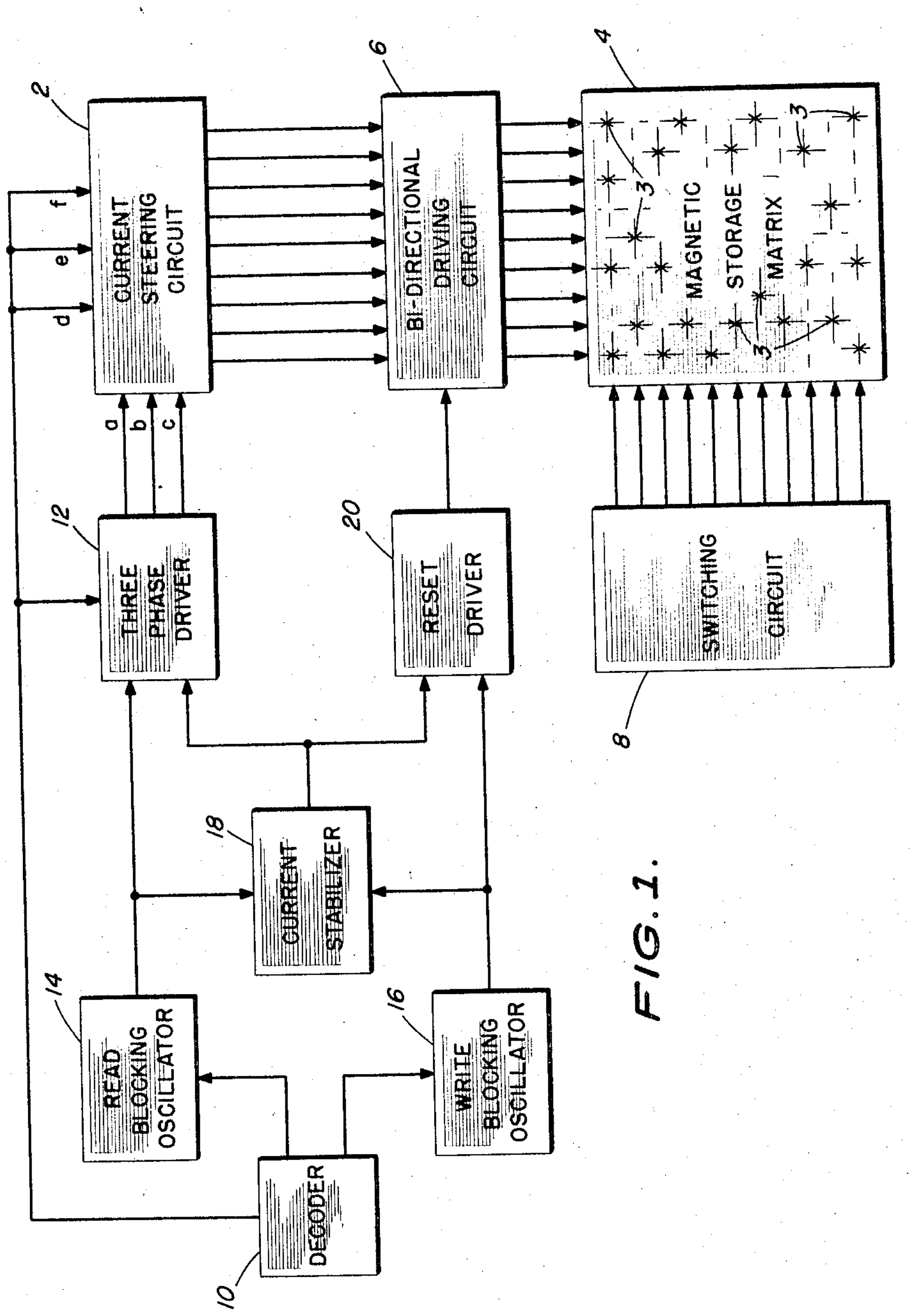
FIG. 1 is a generalized block diagram of the invention.

The toroid ferrite core magnetic storage system shown in FIG. 1 employs a current steering circuit 2 to sequentially energize adjacent columns of cores 3 in its magnetic storage matrix 4 in conjunction with a bi-directional driving circuit 6. The circuit 2 supplies a half-select current to the memory element lines which are associated with adjacent columns in the matrix and which are wound around and electrically coupled to all the cores in adjacent columns. For clarity, in the current steering circuit 2, shown schematically in FIG. 3, the cores arranged horizontally will be designated as rows, whereas those arranged vertically will be called columns. A second switching circuit 8 sequentially energizes adjacent rows of cores in the magnetic storage matrix 4. The toroid ferrite core situated at the intersection of these two energizing signals is interrogated. It is not the purpose of this disclosure to specify the type of row switching circuit 8 employed, for it may vary depending on the environment within which it operates. The only requirement of this circuit is that it be a source of repetitive pulses applied to successive rows. Each row is pulsed as many times as the number of columns of cores it intersects.

The square 10 represents a decoder circuit of a magnetic storage system. This square represents the decoder with all the electronic circuits necessary to furnish command signals to initiate a read-restore cycle required to read out the contents of the magnetic storage matrix 4. It is not the purpose of this disclosure to specify the type of decoder employed, for it may vary depending on the environment within which it operates. The only requirement of this circuit is that it be a source of three signals commonly utilized in magnetic storage systems. The first signal resets a three phase driver circuit 12 and the current steering circuit 2 to their initial settings; the second and third signals are thereafter alternately applied respectively to a read blocking oscillator 14 and a write blocking oscillator 16. These alternately applied signals cause successive memory element lines of the magnetic storage matrix 4 to be first energized in one direction and then in the opposite direction. Therefore these signals, in conjunction with the signals from the switching circuit 8, cause the magnetic storage matrix to be interrogated.

Figure 2:
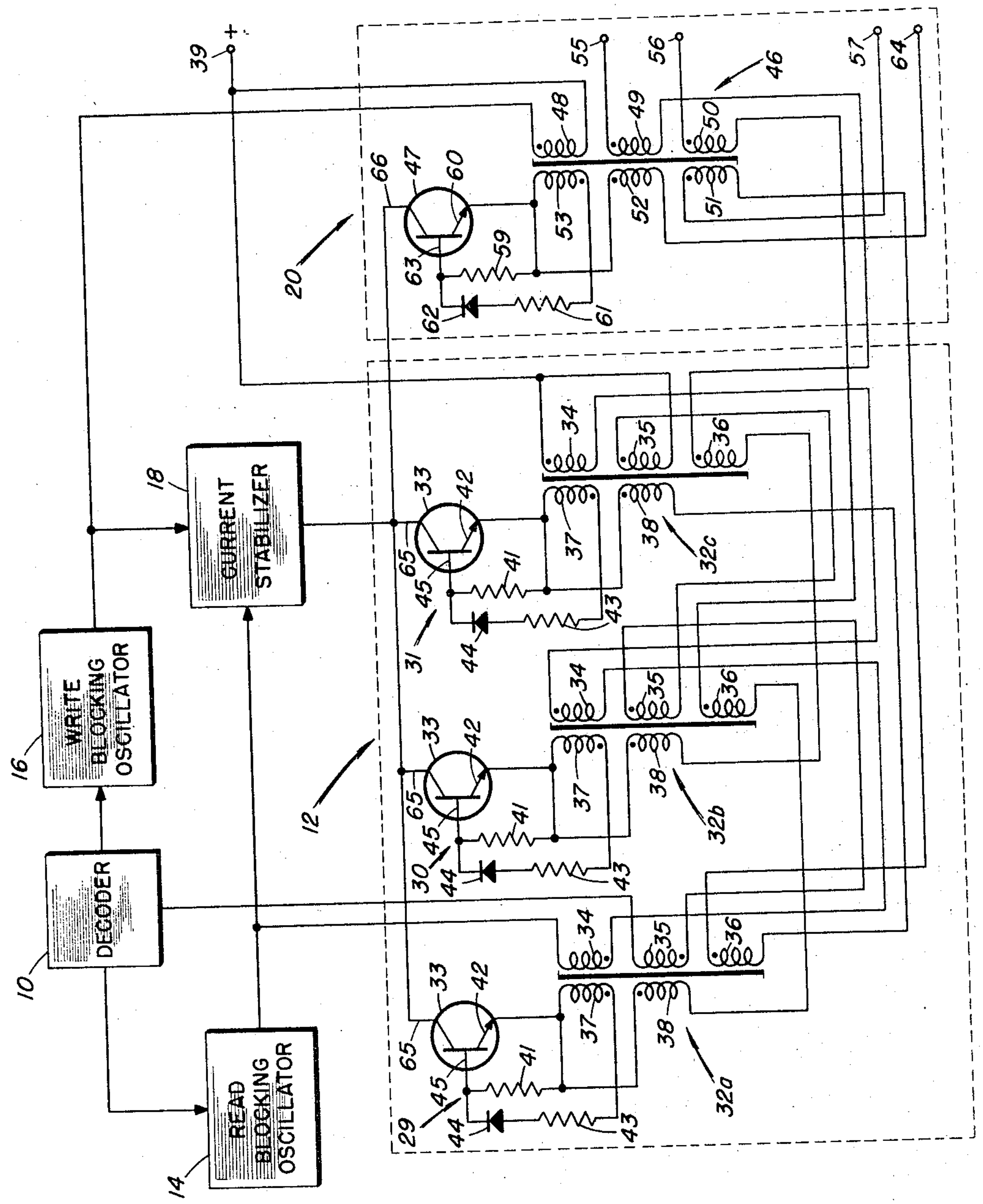
FIG. 2 is a schematic diagram of the three phase driver and the reset driver shown in FIG. 1.

The three phase driver circuit 12 and the reset driver circuit 20 employed in the invention are shown in FIG. 2. The three phase driver circuit 12 includes a plurality of driver circuits 29, 30 and 31, each of which in turn utilizes a magnetic core 32*a*, 32*b*, and 32*c*, respectively, and a switching transistor 33.

Each of the magnetic cores 32 has five inductively coupled windings, namely, a read winding 34, a reset winding 35, a priming winding 36, a trigger winding 37, and an output winding 38. The read windings 34 of each core are connected in series relationship between the read blocking oscillator 14 and a voltage supply terminal 39. Similarly, the reset windings 35 of each core 32 are connected in series relationship between the decoder 10 and said terminal 39. However, the reset winding of the driver circuit 29 is wound in a manner electrically opposite from the remaining reset windings 35. One side of each of the trigger windings 37 of the cores 32 is connected to a resistance element 41 and the emitter lead 42 of the transistor 33, and the other side of each trigger winding is connected to a series connection of a resistance element 43 and a unidirectional current element 44 of the same driver circuit. The other end of the resistance element 41 and the other end of the unidirectional current element 44 are connected to the base lead 45 of the transistor 33 of the same driver circuit.

The reset driver circuit 20 includes a magnetic core 46 and a switching transistor 47. The magnetic core has inductively coupled thereto six windings, namely, a write winding 48, priming windings 49, 50 and 51, an output winding 52, and a trigger winding 53.

The output winding 38 of magnetic core 32*c*, its reciprocal priming winding 36 of the magnetic core 32*a*, and its reciprocal priming winding 51 of magnetic core 46 are connected in series relationship between the junction of the resistance element 41 and the trigger winding 37 of the driver circuit 31 and a signal output terminal 57. The output winding 38 of the magnetic core 32*b*, its reciprocal priming winding 36 of the magnetic core 32*c* and its reciprocal priming winding 49 of the magnetic core 46 are connected in series relationship between the junction of the resistance element 41 and the trigger winding 37 of the driver circuit 30 and a signal output terminal 55. The output winding 38 of the magnetic core 32*a*, its reciprocal priming winding 36 of the magnetic core 32*b*, and its reciprocal priming winding 50 of the magnetic core 46 are connected in series relationship between the junction of the resistance element 41 and the trigger winding 37 of the driver circuit 29 and a signal output terminal 56. The write winding 48 of the magnetic core 46 is connected in series relationship between the write blocking oscillator 16 and the voltage supply terminal 39.

One side of the trigger winding 53 of the magnetic core 46 is connected to the junction of a resistance element 59 and the emitter lead 60 of the switching transistor 47. The other side of the trigger winding 53 is connected to a series connection of a resistance element 61 and a unidirectional current element 62. The other end of the resistance element 59 and the other end of the unidirectional current element 62 are connected to the base lead 63 of the transistor 47. The output winding 52 of the magnetic core 46 is connected in series relationship between the junction of the resistance element 59 of the reset driver circuit 20 and the trigger winding 53 of the magnetic core 46, and the signal output terminal 64. The collector leads 65 of the transistors 33 and the collector lead 66 of the transistor 47 are connected to the current stabilizer 18.

Figure 3:
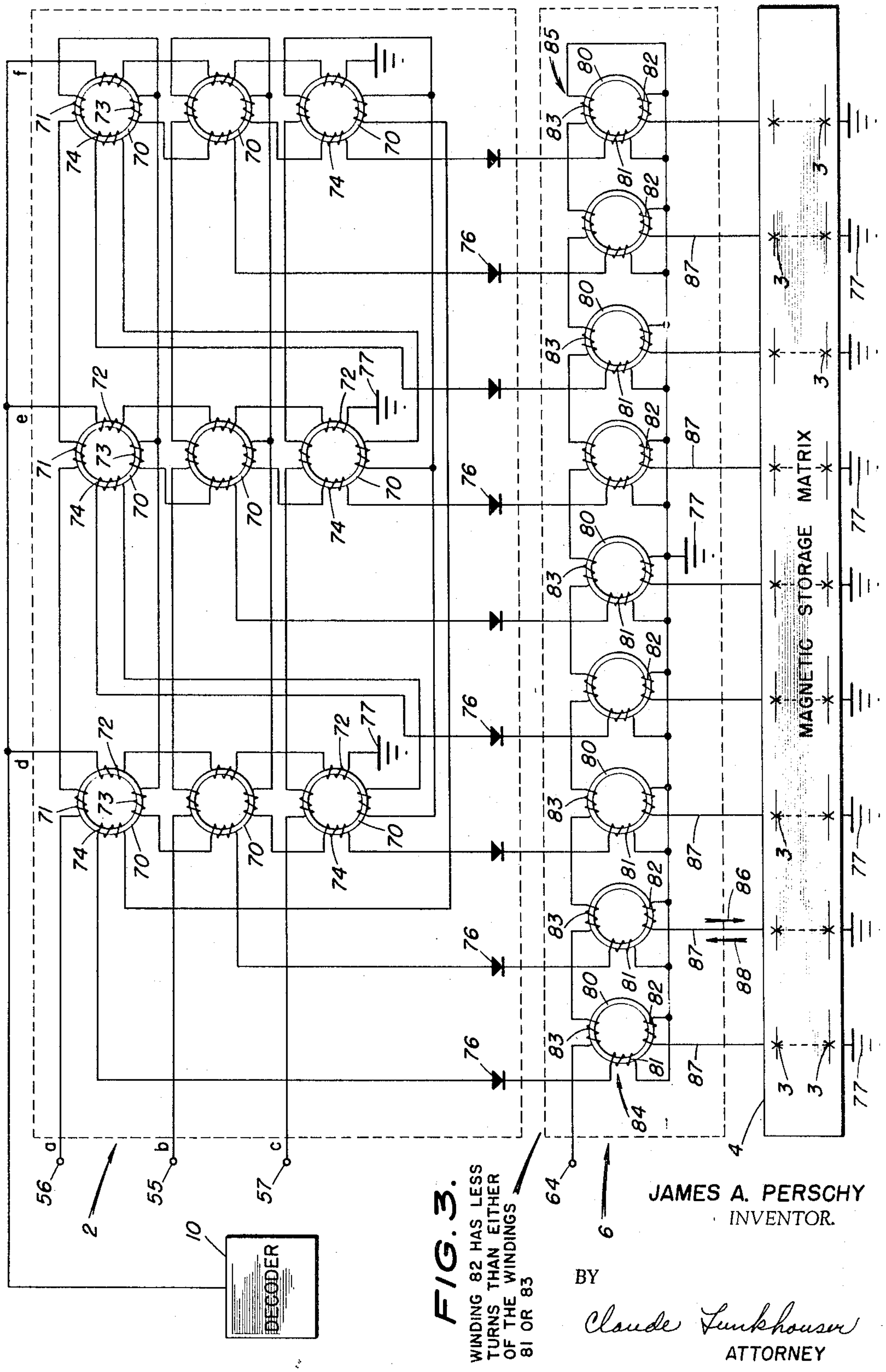
FIG. 3 is a schematic diagram of the current steering circuit and the bi-directional driving circuit employed in the instant invention.

The current steering circuit 2 and the bi-directional driving circuit 6 employed in the invention are shown in FIG. 3. The current steering circuit 2 comprises a plurality of magnetic cores 70 operating as a resettable ring counter and arranged in three rows, *a*, *b*, and *c* and three columns *d*, *e* and *f*. Each of the magnetic cores 70 has inductively coupled thereto four windings, namely, a drive winding 71, a reset winding 72, an output winding 73, and a priming winding 74.

One end of the drive winding 71 of each core 70 is connected to the drive winding of the adjacent cores in the same row. However, the other ends of the drive windings of the cores in column *d* are connected to the terminals 56, 55 and 57, respectively, and the other ends of the drive windings 71 of the cores in column *f* are connected to corresponding ends of the output windings 73 of the cores in the same row. The opposite corresponding end of each output winding 73 is connected to one end of the priming winding 74 of the corresponding core in the next row. It should be noted that the output winding 73 of the last core in each column is connected to the priming winding of the core in row *a* in the adjacent column, and that the output winding of the last core in column *f* is connected to the priming winding of the first core in column *d*. The other end of each priming winding is connected to one end of a unidirectional current element 76.

The sequence of operation of the current steering circuit 2 is determined by the order in which the output winding of one core is connected to the priming winding of a succeeding core. The cores 70 of the instant invention have been interconnected to operate successively starting with the core in row *a* column *d* and then in a similar order down the adjacent columns until the last core in column *f* is reached. At this point, the order of operation is repeated.

The reset winding 72 of each core in each column is connected in series arrangement with the reset windings of the cores in the same column. Additionally, the series connected reset windings in each column are connected between the decoder circuit 10 and ground 77. Furthermore, each reset winding 72 of each core 70 is wound electrically the same except for the reset winding of the core in row *a* column *d*. In this manner the one core wound differently is set in a first state of magnetization and will change state when a drive pulse is applied thereto.

The bi-directional driving circuit 6 comprises a plurality of square loop transformers 80 having inductively coupled thereto three windings: a drive winding 81, an output winding 82, and a reset winding 83. The drive winding 81 of each transformer is connected in series relationship between one end of the unidirectional current element 76 and ground 77. The output winding 82 of each transformer is connected in series arrangement between ground 77 and adjacent memory element lines in the magnetic storage matrix 4. The reset windings 83 of each transformer are connected in series relationship between the signal input terminal 64 and ground 77. The current transformation is obtained by the ratio of turns on the drive winding 81 and the output winding 82.

The sequence of the read-store operation is controlled by the output of the decoder circuit 10. Its first output pulse resets the three phase driver circuit 12 so that driver circuit 29 is in the zero saturated condition and the remaining driver circuits 30 and 31 are in the one saturated condition. This same pulse resets the current steering circuit 2 so that the magnetic core 70 in row *a* and column *d* is in the zero saturated condition.

The first read pulse from the decoder 10 is shaped in the read blocking oscillator 14 and applied to the read winding 34 of the driving circuit 29, driving it to its one saturated condition and developing a pulse on its output winding 38. This read pulse does not affect the other two driver circuits. The output pulse from the winding 38 primes the driver circuit 30 and the reset driver circuit 20 by driving them to their zero saturated condition by means of priming windings 36 and 50, respectively, and at the same time it is available at terminal 56 for application as the phase one driving pulse to row *a* of the three phase driver circuit 2 seen in FIG. 3.

Because of their initial setting, the only core in row *a* affected by the phase one driving pulse is the core in column *d*. This core develops a pulse on its output winding 73 for application to the priming winding 74 of core 70 in row *b* of the same column. The output pulse is also applied to a square loop transformer 80 through a unidirectional current element 76, which pulse drives the square loop transformer to its zero saturated condition, and thereby develops an additional pulse on its output winding 82. The drive pulse developed on the winding 82 generates a current first in the direction of an arrow 86 on a memory element line 87, which current forms the interrogation pulse from one memory element line in the memory matrix 4.

A write pulse from the decoder 10 is shaped in the write blocking oscillator 16 and is applied to the winding 48 of the reset driver circuit 20, driving it to its one saturated condition and developing a pulse on its output winding 52 which appears on the terminal 64 for application as the reset pulse for the square loop transformer circuit 6 seen in FIG. 3. This reset pulse returns the previously driven square loop transformer 80 to its one saturated condition, developing a pulse on its output winding 82. This pulse drives a current in the direction of an arrow 88 on the line 87 and it restores the information to the memory core previously interrogated.

Successive read pulses drive the phase drivers in order, furnishing successive phase driver pulses on successive rows of the current steering circuit 2. An output pulse from the current steering circuit drives successive square loop transformers in the bi-directional driving circuit 6 as a result of the operation of the current steering circuit 2 as a ring counter in response to the successive pulses from the three phase driver 12. The write pulse restores the information interrogated from the memory matrix 4 after each interrogation pulse. In this manner successive memory element lines of the memory matrix 4 are first energized in one direction to interrogate the contents of the memory and then in the opposite direction to restore the contents of the memory matrix before stepping to the next column to perform the next operation.

The instant invention is designed to operate with magnetic storage systems of varying capacities without major modifications. Each of the driver circuits 29, 30 and 31 is associated with a corresponding row of cores 70 in the current steering circuit 2. Additionally, each of the cores 70 is associated with a corresponding core 80 and memory element line 87 of the matrix 4. Therefore, the capacity of the instant invention can be expanded by adding additional columns of cores 70 to the current steering circuit 2 and corresponding cores 80 in the bi-directional driving circuit 6.

The interconnection of several windings assures the cyclic operation of the instant invention. For example, the output winding 38 of the core 32*c* is connected in series with its corresponding priming winding 36 of the next successive core 32*a*, and the corresponding priming winding 51 of the reset driver 20. Additionally, the priming winding 51 of the driver 20 is associated with a corresponding row in the current steering circuit 2. Also, the output winding of the core 70 in row *a*, column *d* of the current storing circuit 2 is connected to the priming winding 73 of the next successive core in the same column. This order of interconnecting the output winding of one core with the priming winding of the next core assures cyclic operation.

Obviously, many modifications and variations of the present invention are possible in the light of the above teachings. It is therefore to be understood that within the scope of the appended claims the invention may be practiced otherwise than as specifically described.

What is claimed is:

1. In combination with a two axis magnetic storage matrix including a plurality of magnetic elements arranged in aligned groups as rows and intersecting columns, a bi-directional current steering device for alternately supplying read-restore signals to each group of elements aligned along one axis of said storage matrix comprising, a plurality of memory element lines, each of which is electromagnetically coupled to each of the elements in a group aligned along said one axis of said storage matrix, a first plurality of magnetic cores, each of which is equipped with an output winding, a prime winding, a reset winding and a drive winding, said prime winding of each magnetic core being connected to the output winding of a different one of said magnetic cores, whereby one core is primed for operation each time an output pulse appears at a different core and whereby said plurality of magnetic cores operates as a ring counter so that an output pulse is produced from said magnetic cores, in succession, each time a drive pulse is applied to said ring counter, said reset windings being interconnected to be concurrently energized upon application of a reset pulse to said ring counter and at least one of said reset windings being wound in a manner electrically opposite from the remaining reset windings, whereby a predetermined count setting is established on said ring counter upon application of said reset pulse to said ring counter, a second plurality of magnetic driver cores, each having two magnetic remanent states and each being equipped with a drive winding, an output winding and a reset winding, a plurality of unidirectional current devices for applying each successive output pulse produced by said ring counter to the drive winding of a different one of said driver cores, whereby each driver core is changed, in succession, from a first to a second remanent state to produce a storage read output pulse at its output winding having a predetermined polarity to read the elements of said magnetic storage matrix, the output winding of each of said driver cores being connected to a different one of said memory element lines, the reset windings of said driver cores being interconnected so as to be concurrently energized upon application of a reset pulse to said driver cores, a third plurality of magnetic cores, each of which is equipped with a read winding, a reset winding, a prime winding and an output winding, the read winding of each core in said third plurality being interconnected to be concurrently energized upon application of a read pulse to said third plurality of cores, the output winding of each core in said third plurality being connected to the prime winding of another core in said third plurality, whereby said third plurality of cores operates cyclically and one output pulse is produced from said third plurality of cores, in succession, for each read pulse applied to said third plurality of cores, circuit means for applying each output pulse produced by said third plurality of cores to the drive windings of said ring counter cores, the reset windings of the cores in said third plurality being interconnected to be concurrently energized by a reset pulse applied to said third plurality of cores and one of said reset windings being wound electrically opposite from the reset windings of the remaining cores of said third plurality, whereby application of said reset pulse causes said third plurality of cores to begin cycling from a predetermined starting condition, a reset driver core equipped with a write winding, an output winding and a plurality of prime windings, each of said plurality of prime windings for said reset driver core being connected to be energized by the output pulse produced by a different one of said third plurality of cores, whereby said reset driver core is primed for operation each time an output pulse is produced by said third plurality of cores, the output winding of said reset driver core being connected to the reset windings of said second plurality of magnetic driver cores, whereby upon application of a write pulse to the write winding of said reset driver core, an output pulse is produced by said reset driver core effective to return whichever one of said second plurality of cores is then in its second remanent state back to its first remanent state and thereby produce a storage restore output pulse of opposite polarity from said storage read output pulse for application to said connected memory element line, and a source of pulses connected to each of said ring counter, said third plurality of cores and said reset driver core for applying reset pulses to said ring counter and said third plurality of cores, whereby said ring counter is reset to said predetermined count setting and said third plurality of cores is reset to said predetermined starting condition, and for subsequently applying alternately read pulses to said third plurality of cores and write pulses to said reset driver core, whereby one after another of said magnetic driver cores is driven and then reset to apply storage read and then storage restore current in one after another of said connected memory element lines.

2. The bi-directional current steering device specified in claim 1 wherein, each magnetic core in said third plurality and said reset driver core are further equipped with a trigger winding, and further including, a transistor switching circuit connected to each trigger winding for aiding in changing the magnetic state of each core in said third plurality and said reset driver core.

3. In combination with a two axis magnetic storage matrix including a plurality of magnetic elements arranged in aligned groups as rows and intersecting columns, a bi-directional current steering device for alternately supplying read-restore signals to each group of elements aligned along one axis of said storage matrix comprising, a plurality of memory element lines, each of which is electromagnetically coupled to each of the elements in a different group aligned along said one axis of said storage matrix, a first plurality of magnetic cores, each of which is equipped with an output winding, a prime winding, a reset winding and a drive winding, said prime winding of each mganetic core being connected to the output winding of a different magnetic core whereby one core is primed for operation each time an output pulse appears at a different core and whereby said plurality of magnetic cores operates as a ring counter, a first pulse source connected to apply drive pulses to the drive windings of said magnetic cores, whereby output pulses are developed at the output windings of said plurality of magnetic cores in succession, a second plurality of magnetic driver cores corresponding in number to the number of memory element lines, each having two magnetic remanent states and being equipped with a drive winding, a reset winding, and an output winding, the output winding of each of said driver cores being connected to a different one of said memory element lines, the drive winding of each of said driver cores being connected to said ring counter to be energized by one of the successive output pulses therefrom, whereby said driver cores are one after another changed from a first to a second remanent state and whereby a pulse of first polarity is developed at the output winding of each of said driver cores in succession to produce a read current signal in one after another of said connected memory element lines, a second pulse source connected to the reset winding of each of said magnetic driver cores for applying a reset pulse to each driver core, subsequent to the application of said ring counter output pulse, effective to return said driver core from said second to said first remanent state whereby an output pulse of second polarity opposite from said first polarity is developed at the output winding of each driver core to furnish a restore current signal in each of said connected memory element lines, and a third pulse source connected to apply a reset pulse to each reset winding of said first plurality of magnetic cores, at least one of said reset windings of said first plurality of cores being wound in a manner electrically opposite from the remaining reset windings of said first plurality of cores, whereby a predetermined count setting is established on said first plurality of cores upon application of said reset pulse from said third pulse source.

References Cited by the Examiner

UNITED STATES PATENTS

| | | | |
|---|---|---|---|
| 2,734,187 | 2/1956 | Rajchman | 340—174 |
| 2,882,517 | 4/1959 | Warren | 340—174 |
| 2,946,985 | 7/1960 | McMillan | 307—88 |
| 3,075,183 | 1/1963 | Warman | 340—174 |
| 3,087,071 | 4/1963 | Richards | 340—174 |
| 3,134,023 | 5/1964 | Russell | 307—88 |
| 3,128,453 | 8/1964 | Busch | 340—174 |
| 3,239,681 | 3/1966 | Bond | 307—88 |

JAMES W. MOFFITT, *Acting Primary Examiner.*

K. CLAFFY, B. KONICK, *Examiners.*

M. S. GITTES, *Assistant Examiner.*